US006962015B2

(12) United States Patent
Tyler et al.

(10) Patent No.: US 6,962,015 B2
(45) Date of Patent: Nov. 8, 2005

(54) SOUND ACTUATED DISPLAY DEVICE INCORPORATING VIBRATORY-ROTARY MOTION CONVERTER

(76) Inventors: Wesley Tyler, 25246 W. Monaville Rd., Lake Villa, IL (US) 60046; George Tyler, 9735 Highway 69 North, Cottage Grove, TN (US) 38224

(*) Notice: Subject to any disclaimer, the term of this patent is extended or adjusted under 35 U.S.C. 154(b) by 0 days.

(21) Appl. No.: 10/444,355

(22) Filed: May 23, 2003

(65) Prior Publication Data

US 2004/0231204 A1 Nov. 25, 2004

(51) Int. Cl.[7] ............................ H02K 7/06; G09F 19/00

(52) U.S. Cl. ............................ 40/427; 40/411; 310/20; 310/80; 340/816.76

(58) Field of Search .......................... 40/427, 411, 455; 446/175, 484, 236, 242, 485; 310/20, 80; 340/815.76

(56) References Cited

U.S. PATENT DOCUMENTS

| | | | | |
|---|---|---|---|---|
| 4,232,304 A | * 11/1980 | Durley, III | ............. | 340/815.76 |
| 4,903,424 A | 2/1990 | Satoh et al. | | |
| 5,056,249 A | * 10/1991 | Sakurai | ........................ | 40/414 |
| 5,090,936 A | 2/1992 | Satoh et al. | | |
| 5,176,560 A | 1/1993 | Wetherell et al. | | |
| 5,735,726 A | 4/1998 | Cohen | | |

* cited by examiner

*Primary Examiner*—Cassandra Davis
(74) *Attorney, Agent, or Firm*—Timothy J. Fullin

(57) ABSTRACT

A sound actuated display device incorporating a vibratory-rotary motion converter to convert vibrations resulting from sounds and music to rotary motion. The rotary motion causes display elements to move and pulse in a manner synchronized to the rhythms of the sounds and music. The result is an aesthetically interesting display of motion.

9 Claims, 15 Drawing Sheets

SOUND ACTUATED DISPLAY DEVICE INCORPORATING VIBRATORY-ROTARY MOTION CONVERTER

CROSS-REFERENCE TO RELATED APPLICATIONS

Not Applicable

STATEMENT REGARDING FEDERALLY SPONSORED RESEARCH/DEVELOPMENT

The present invention does not involve any form of federally sponsored research or development.

BACKGROUND OF THE INVENTION

The present invention relates to display devices, generally, and more specifically to display devices incorporating vibratory-rotary motion converters. These devices are known in the art, as exemplified in U.S. Pat. No. 4,232,304 to Durley.

The display device disclosed in the Durley patent comprises a vibratory-rotary motion converter responsive to electrical signals received from an external sound source electrically connected to the device. The Durley device, however, has limitations inherent to its design and the now obsolete technology available at the time of its invention. The vibratory motion in the Durley device, for example, is not capable of being triggered by ambient sounds. Rather, electrical output from an external sound source must be attached to the device, or a sound source must be included within the device, to actuate the motion converter. Additionally, black light must be used to illuminate the display, thus making the device less attractive in relatively bright conditions. Finally, the rotary motion aspect of the Durley device is less than optimal in some applications, most especially when increasing the scale to make a larger version of the device, and when the device is used as a ceiling-mounted fixture. Since the time of Durley's patent, microprocessors have become readily available, and various improvements in both mechanical and electrical engineering have provided the means to improve upon the performance of the device as well as decrease the manufacturing cost.

Other display devices, such as the "Dancing Toy" variety exemplified in U.S. Pat. No. 5,735,726 to Cohen, U.S. Pat. No. 5,176,560 to Wetherell et al., U.S. Pat. Nos. 4,903,424 and 5,090,936 to Satoh et al., and U.S. Pat. No. 5,056,249 to Sakurai, are known in the art to be able to respond to ambient noise, including music. None of these devices, however, incorporate a vibratory-rotary motion converter. While some of these devices comprise amplifier circuits, the amplifier circuits are not well-suited to driving a vibratory-rotary motion converter.

BRIEF SUMMARY OF THE INVENTION

It is an object of the present invention to provide a unique and interesting display device that incorporates a vibratory-rotary motion converter capable of converting vibrations resulting from sounds and music into rotary motion. The resultant rotary motion causes flexibly mounted display elements to move and pulse rhythmically to the sound and music.

Further objects, advantages and features of the present invention will present themselves in the following detailed description and drawings.

DETAILED DESCRIPTION OF THE PREFERRED EMBODIMENT

Figure 1:
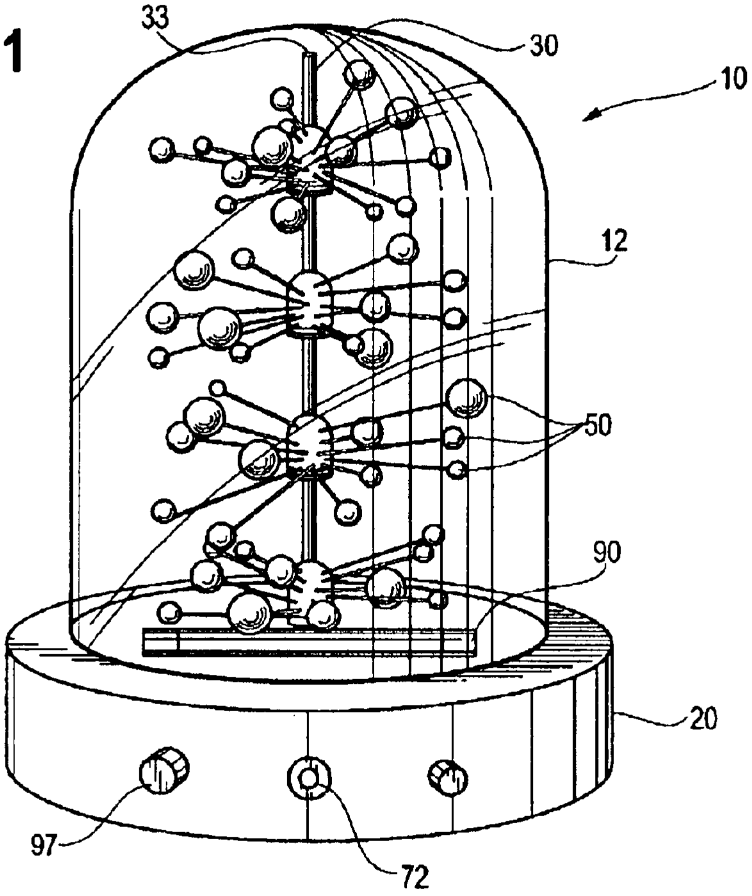
FIG. 1 is a lateral view of the invention.
Figure 2:
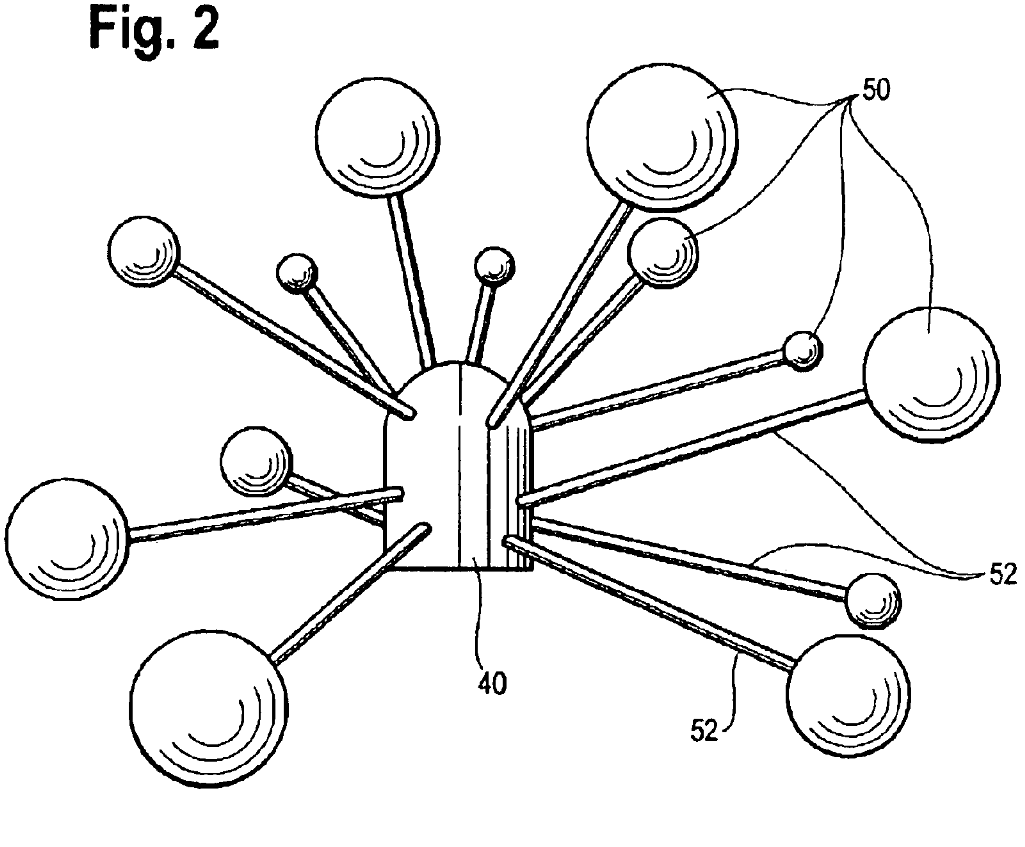
FIG. 2 is a lateral view of a hub and examples of display devices.
Figure 3:
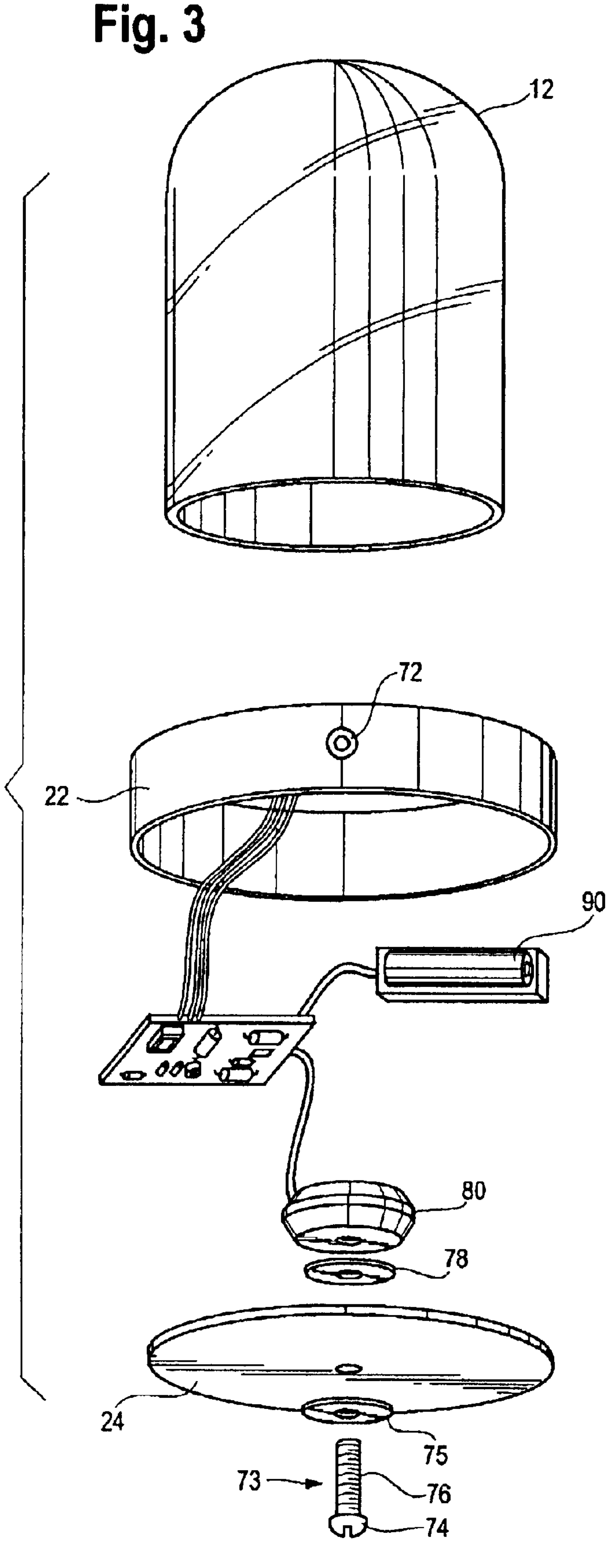
FIG. 3 is an exploded view of the base assembly and dome.
Figure 4:
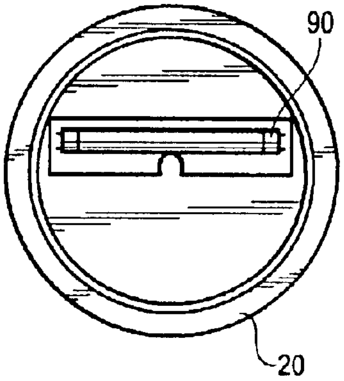
FIG. 4 is a top view of the base.
Figure 5:
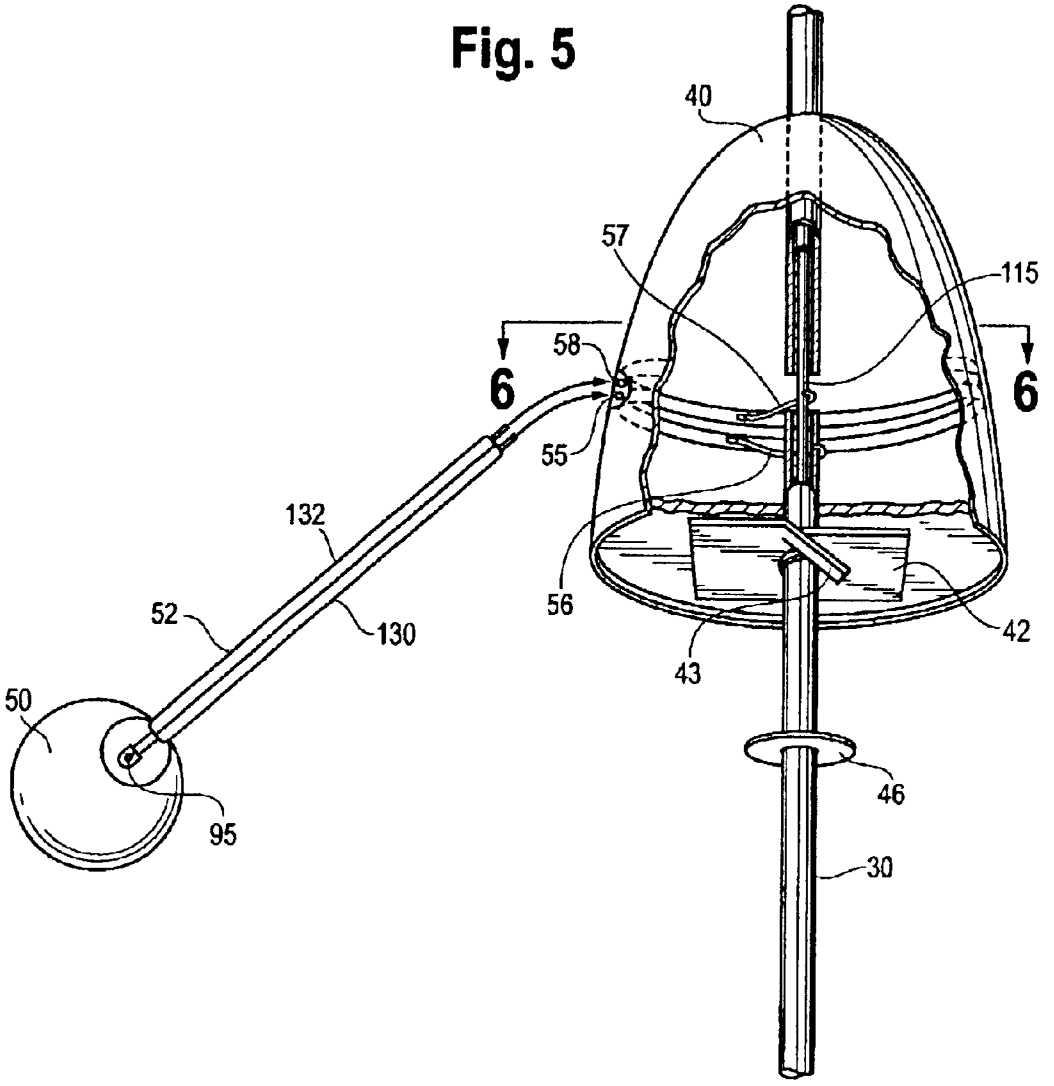
FIG. 5 is a view of a hub assembly exemplifying the Light Emitting Diode circuit comprising two glides and a conductive hub.
Figure 6:
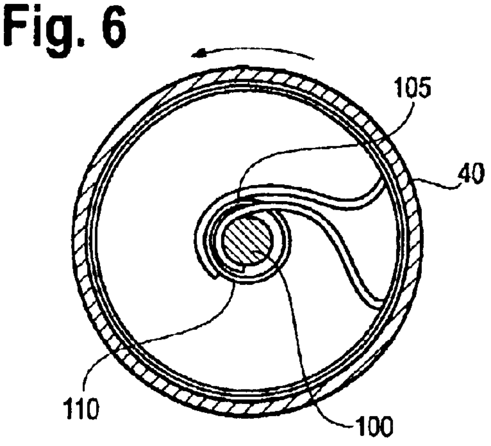
FIG. 6 is a top view of a cross-section of a hub assembly exemplifying a Light Emitting Diode circuit comprising two glides and a conductive hub.
Figure 7:
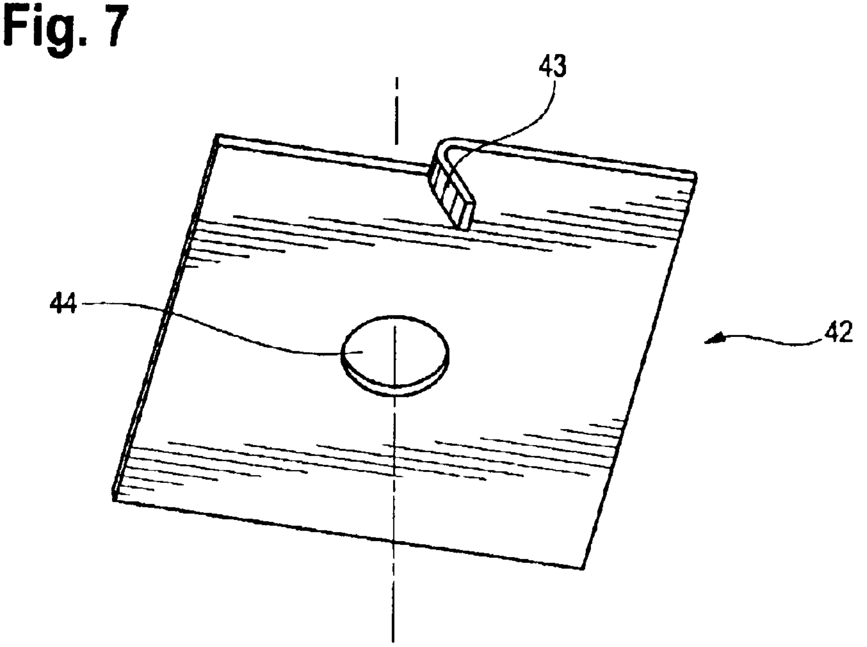
FIG. 7 is an angled view of a brake.
Figure 8:
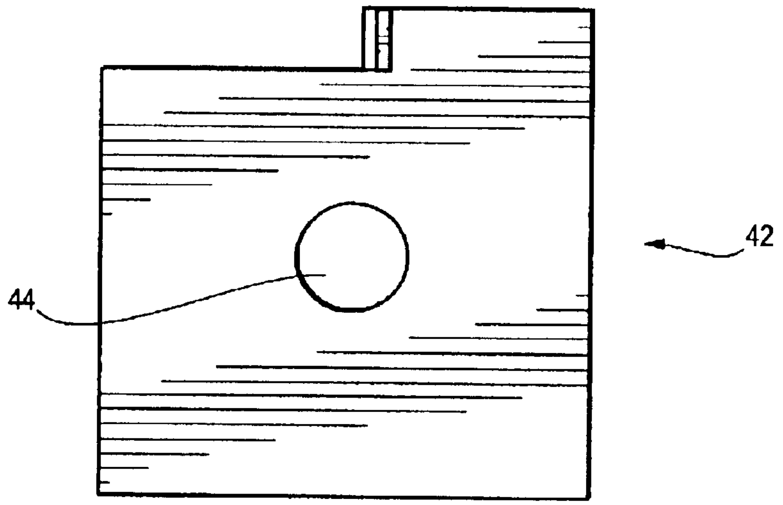
FIG. 8 is a top view of a brake.
Figure 9:
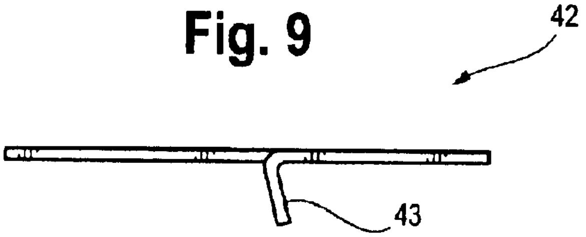
FIG. 9 is a lateral view of a brake.
Figure 10:
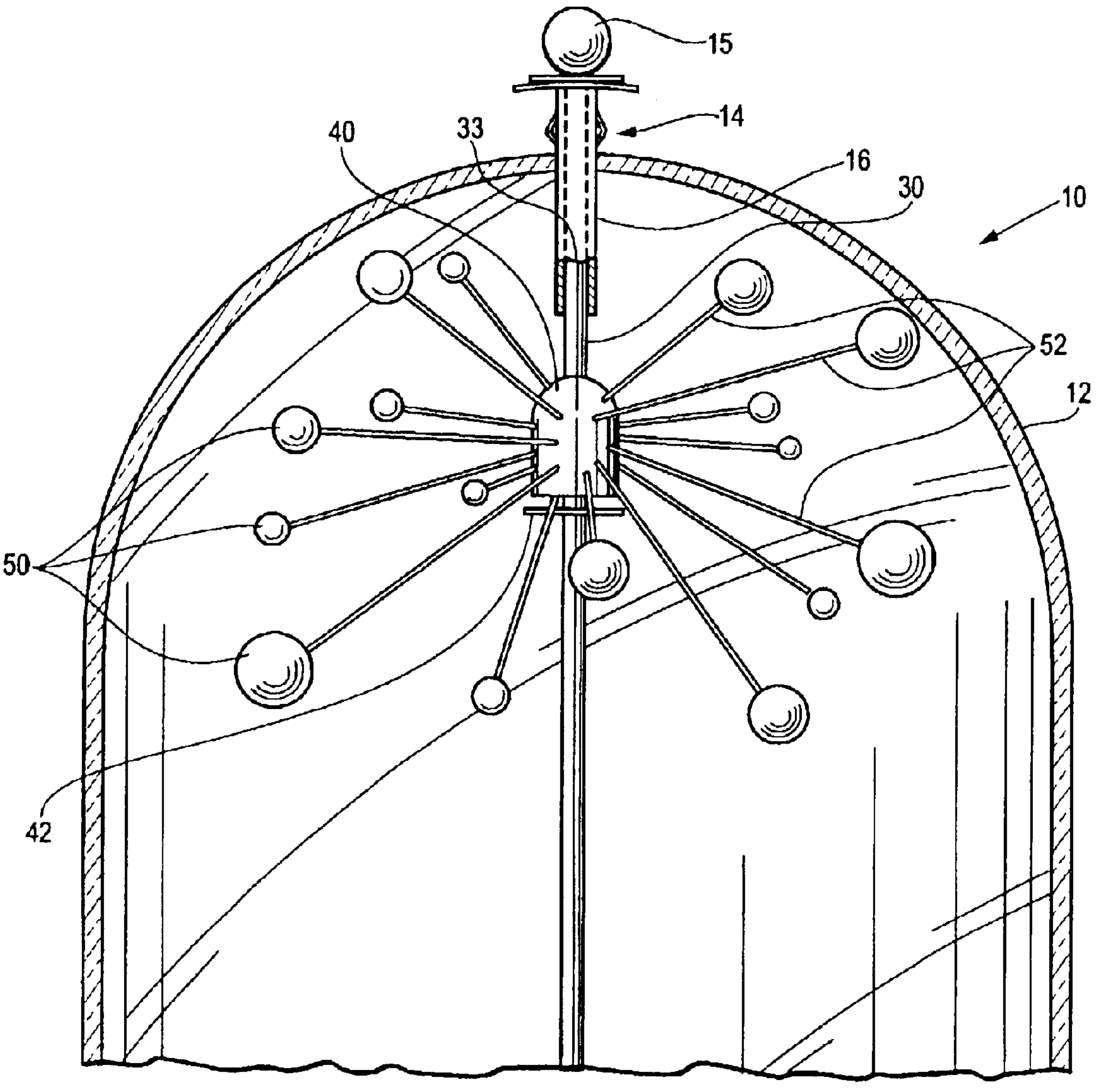
FIG. 10 is a lateral view of a portion of the dome, showing a hub assembly and vibratory member secured by a vibratory member securing means.
Figure 11:
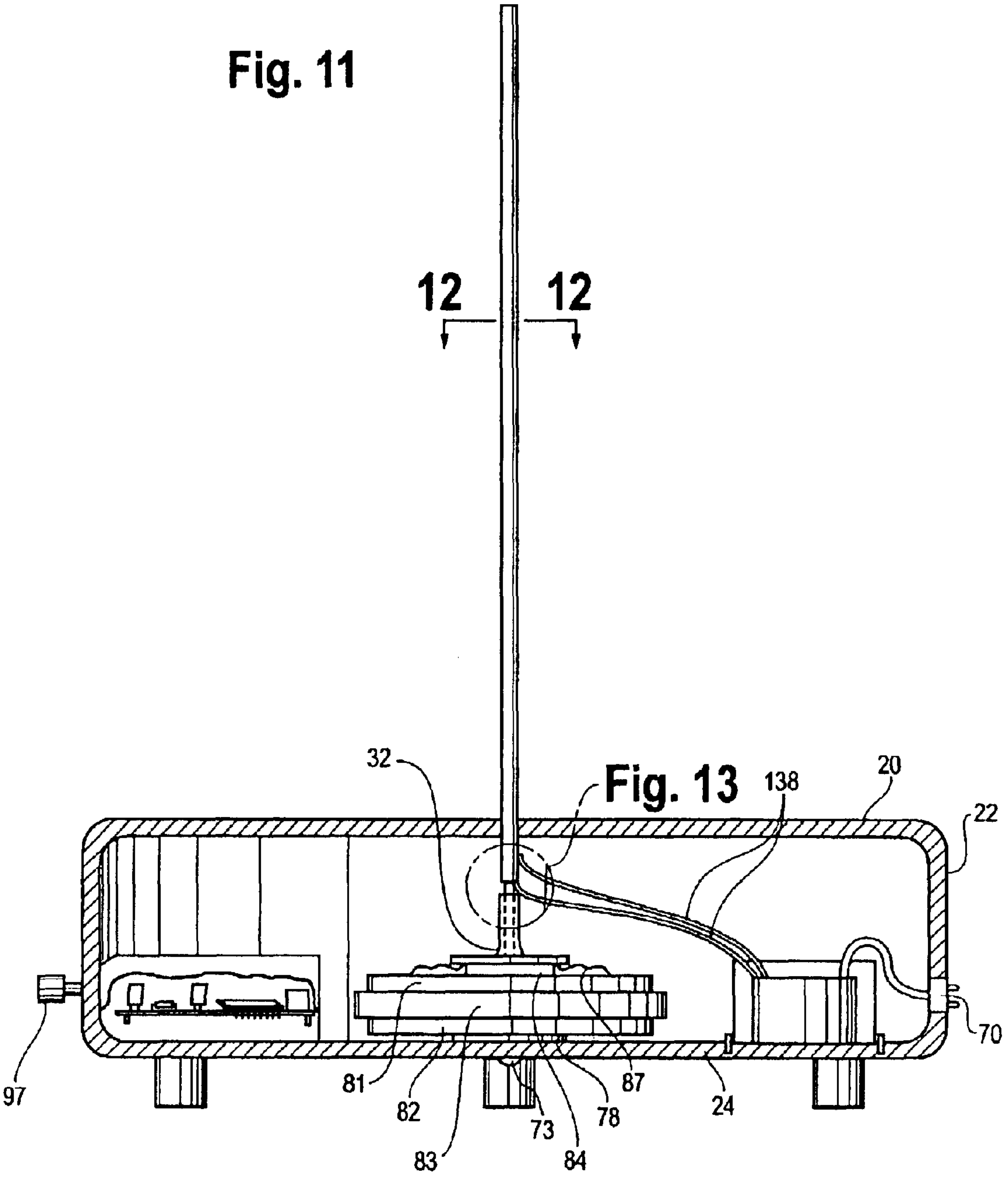
FIG. 11 is a lateral section view showing the assembly within the base by cross-section, including a schematic representation of the circuit board, voice coil, and power supply for the Light Emitting Diode circuit.
Figure 12:
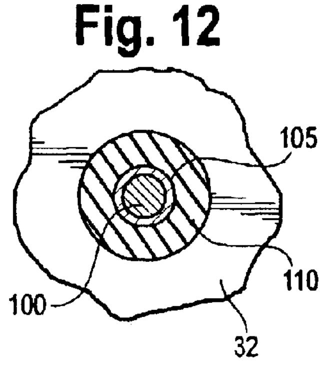
FIG. 12 is a top view of the vibratory member and surrounding structures.
Figure 13:
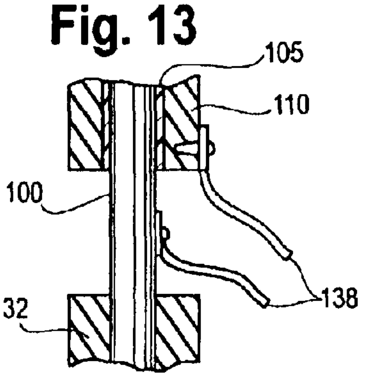
FIG. 13 is a detail showing the power supply connection to the Light Emitting Diode circuit.
Figure 15:
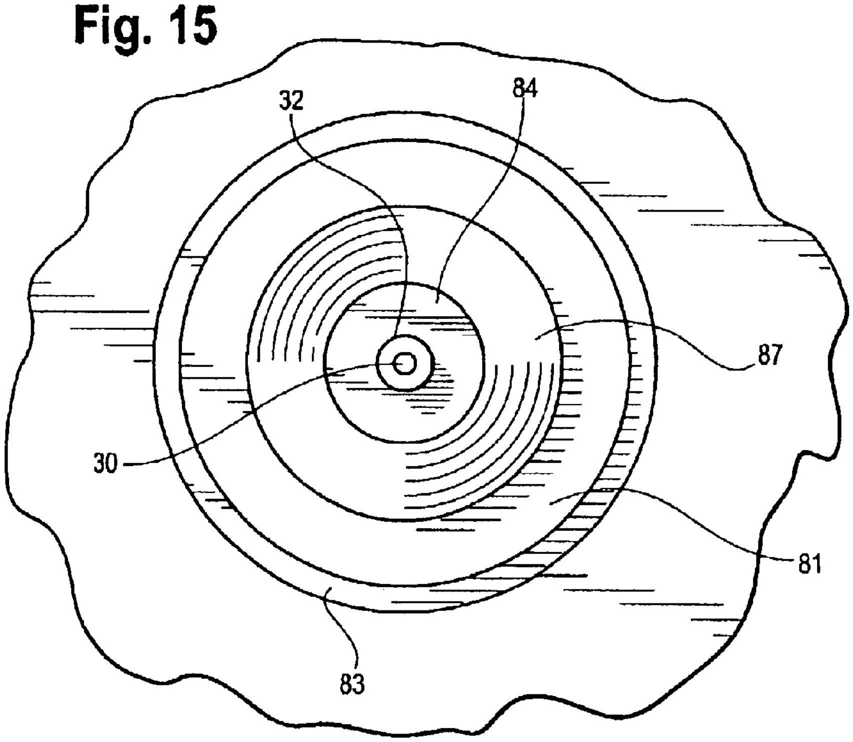
FIG. 15 is a top view further detailing the relationship between the vibratory member and structures within the base.
Figure 14:
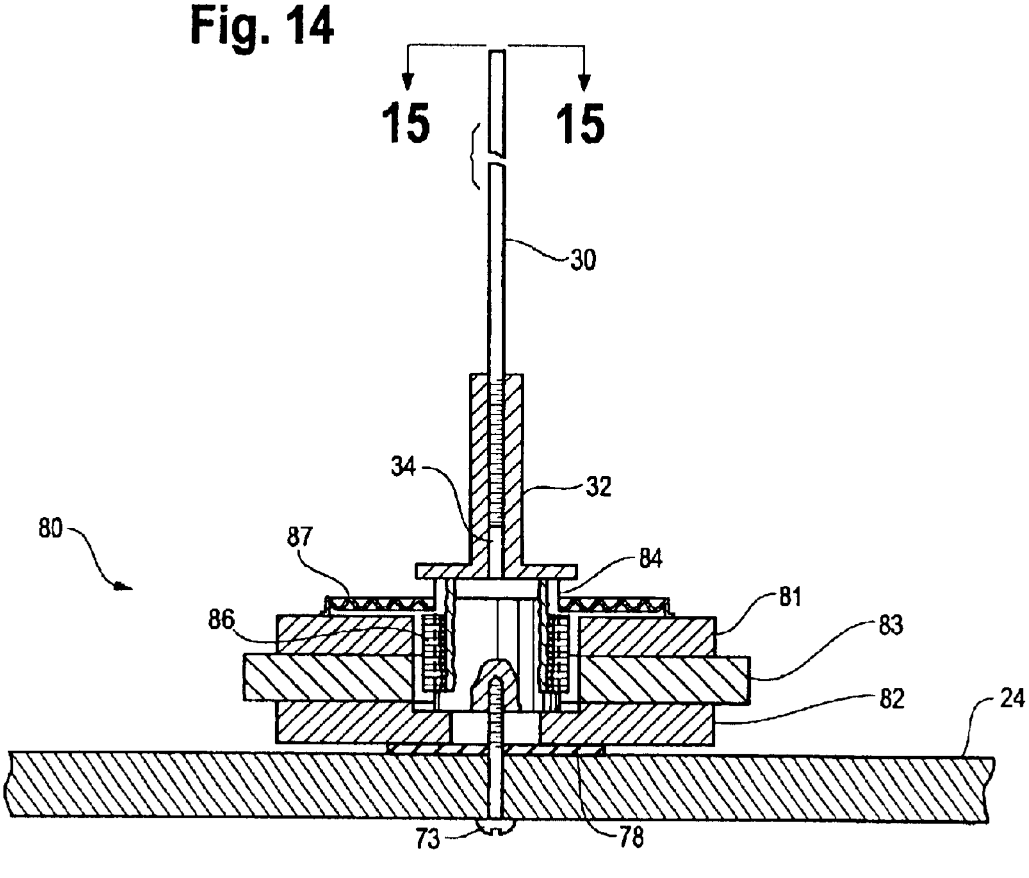
FIG. 14 is a lateral section view showing a detail of the relationship between the vibratory member and structures within the base.
Figure 16:
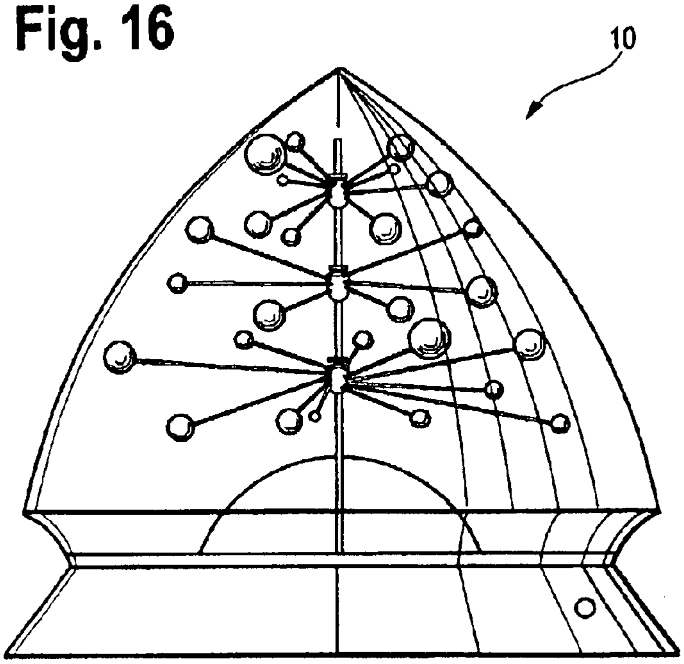
FIG. 16 is an example of an alternative embodiment of the invention.
Figure 17:
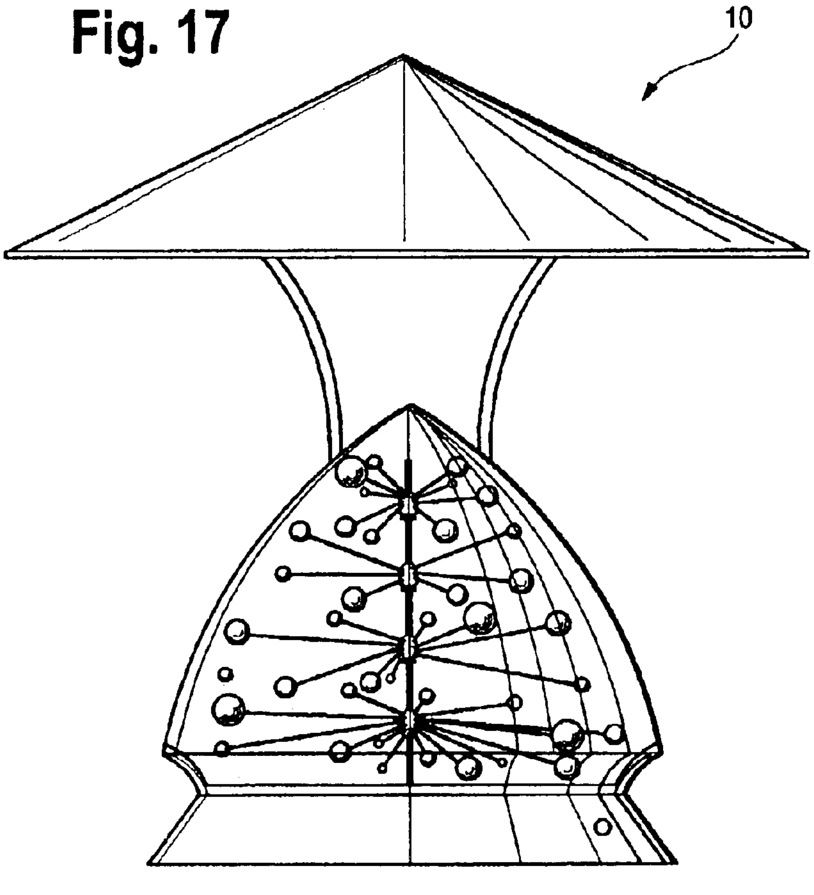
FIG. 17 is an example of an alternative embodiment of the invention.
Figure 18:
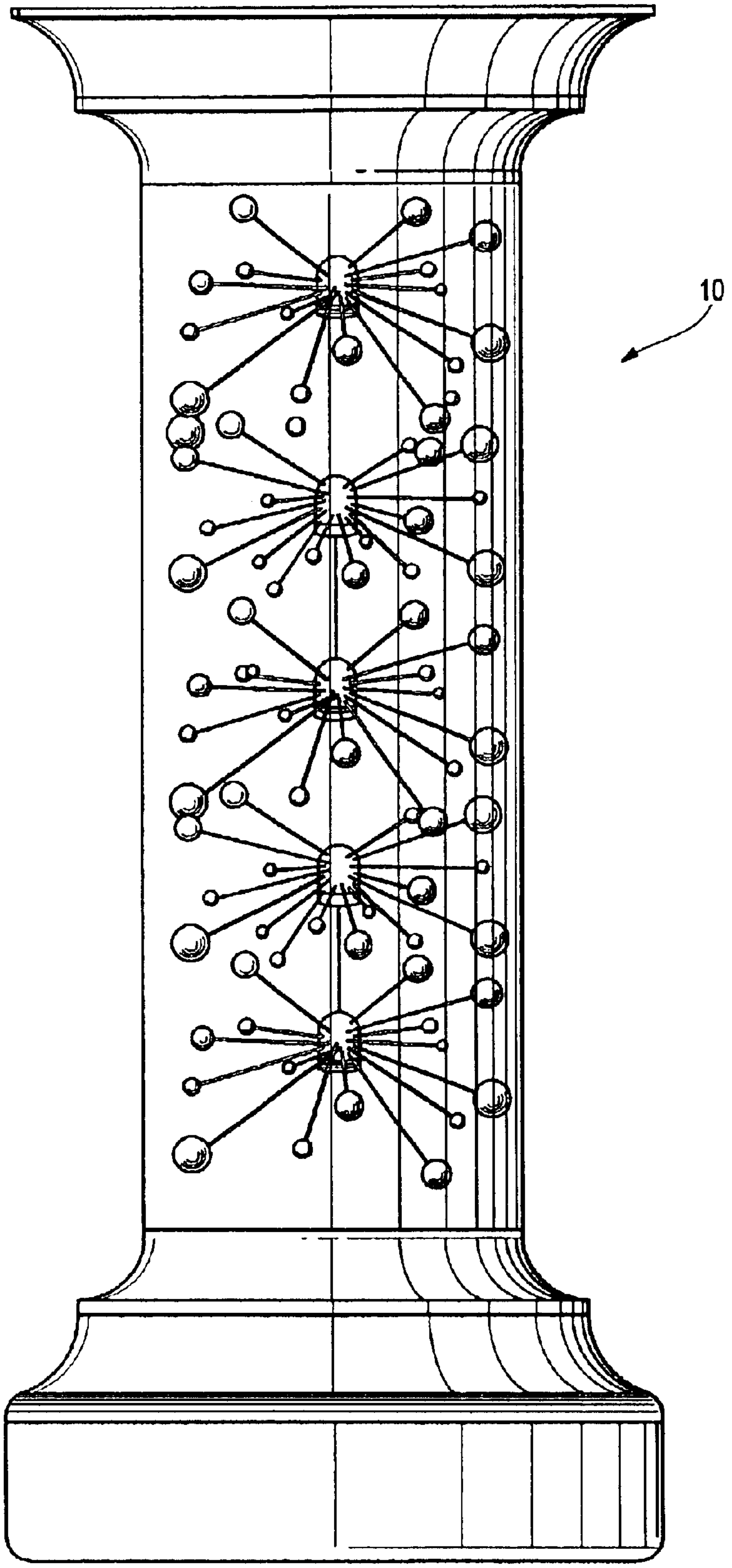
FIG. 18 is an example of an alternative embodiment of the invention.
Figure 19:
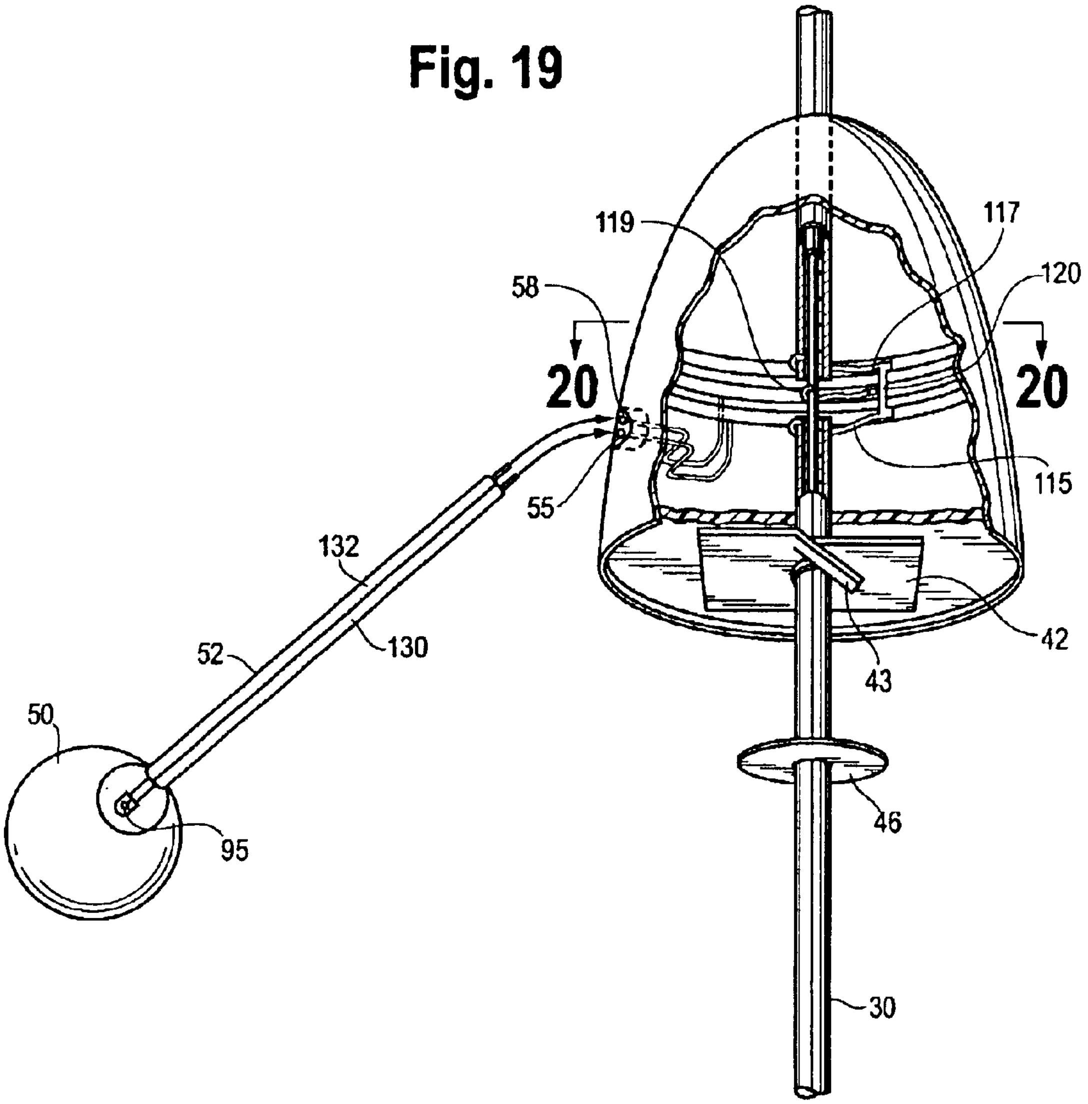
FIG. 19 is a view of a hub assembly exemplifying the Light Emitting Diode circuit comprising three glides and a conductive bridge.
Figure 20:
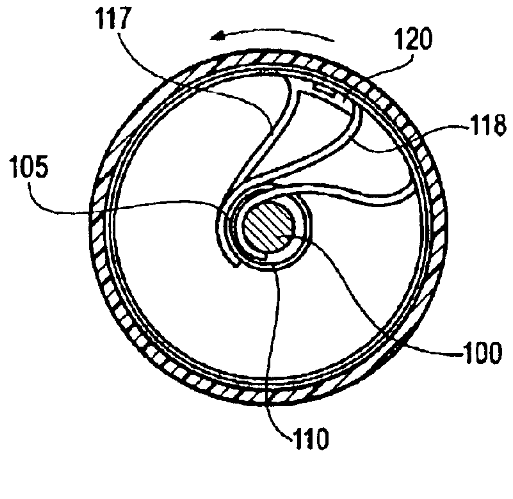
FIG. 20 is a top view of a cross-section of a hub assembly exemplifying a Light Emitting Diode circuit comprising three glides and a conductive bridge.
Figure 21:
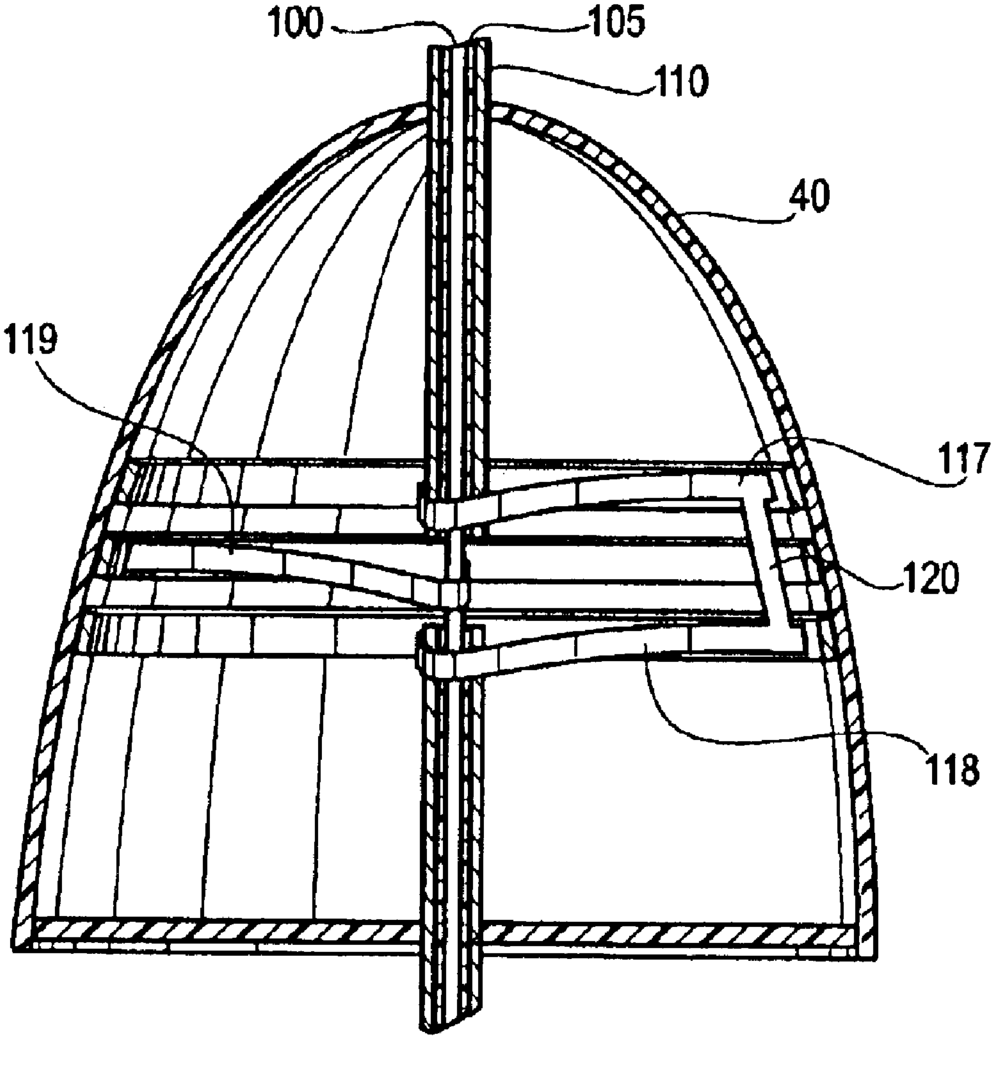
FIG. 21 is a side view of a cross-section of a hub assembly exemplifying a Light Emitting Diode circuit comprising three glides and a conductive bridge.
Figure 21A:
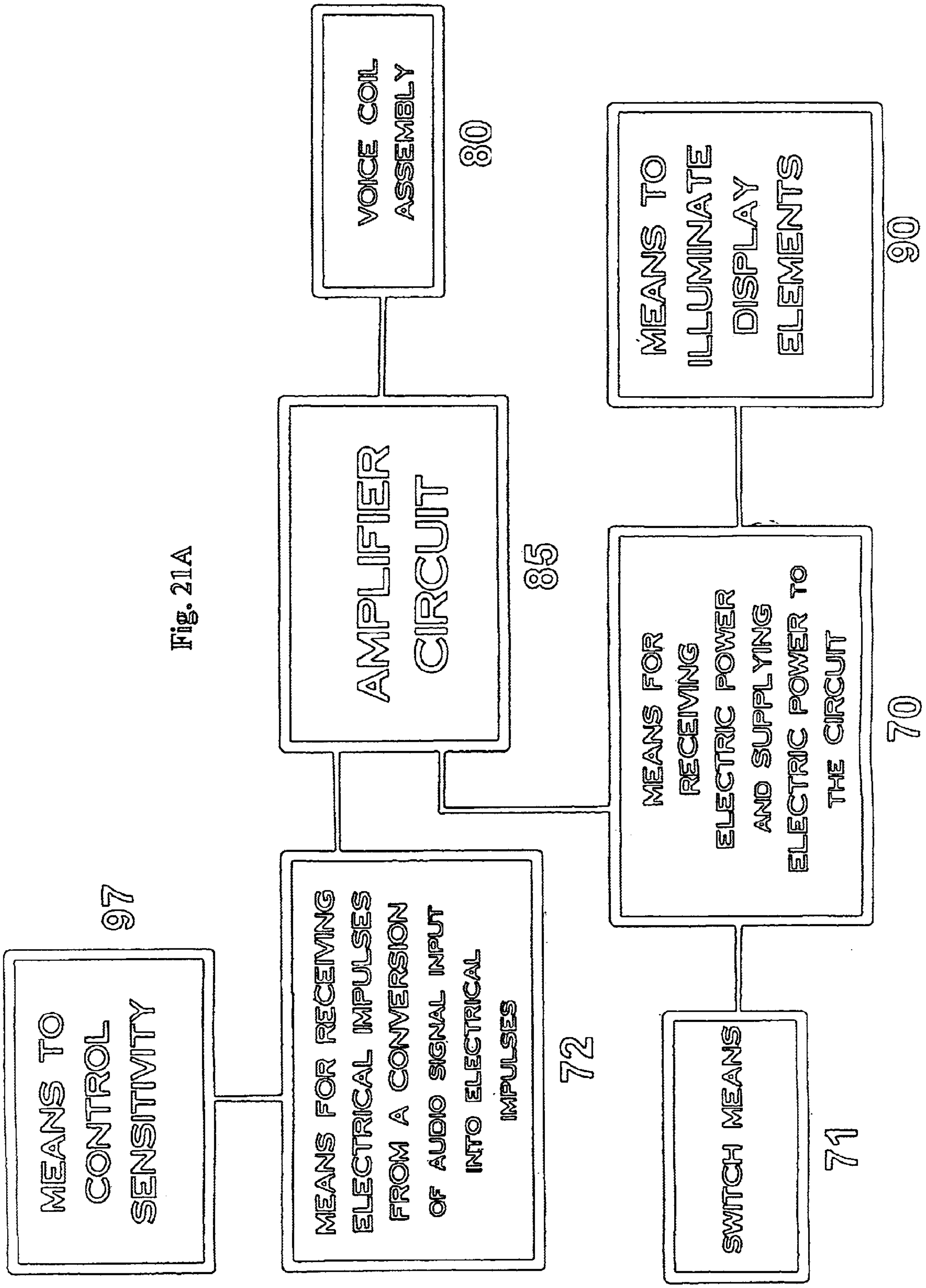
FIG. 21A is a schematic representation of the electrical circuit comprising a single amplifier circuit.
Figure 22:
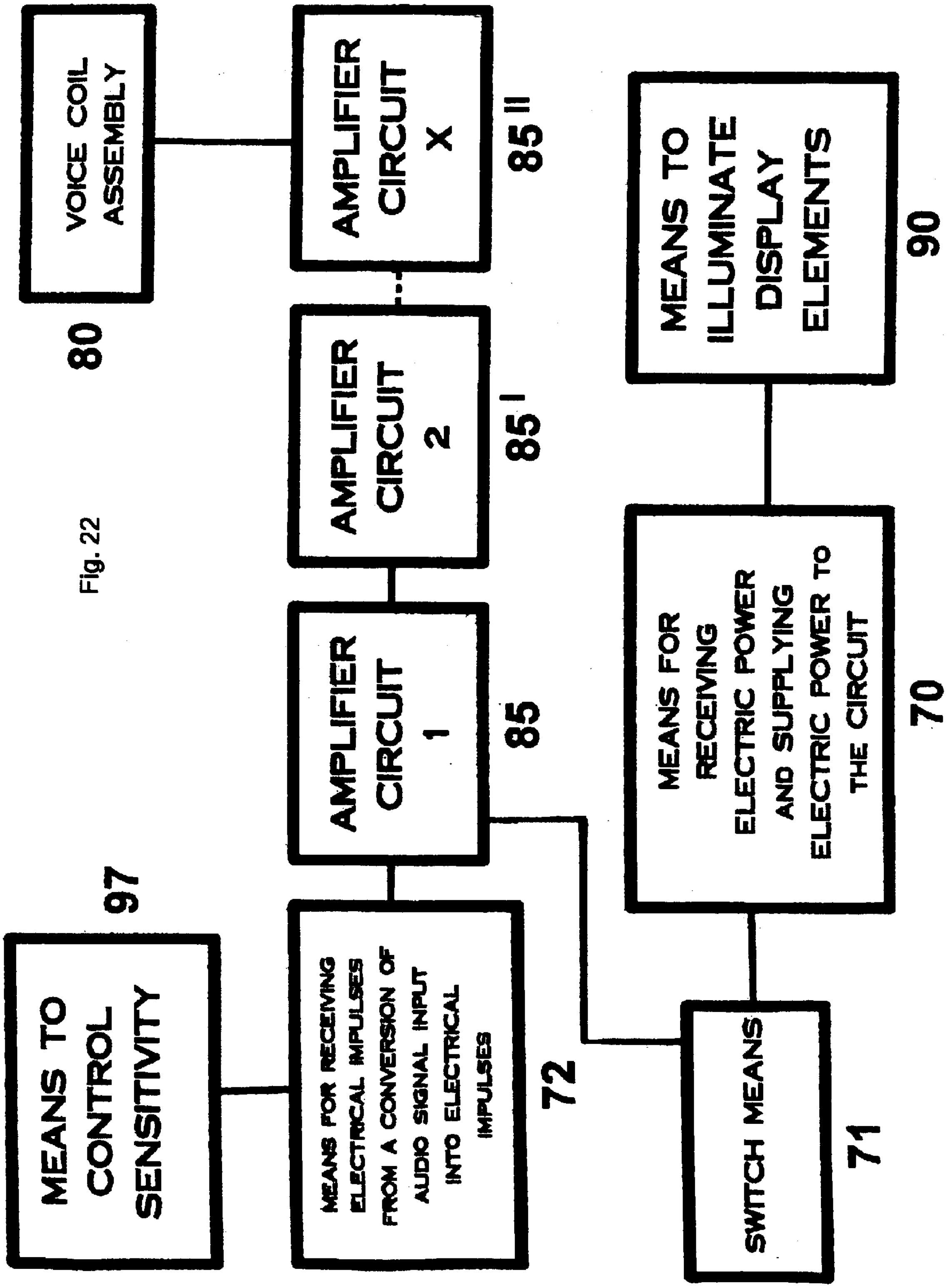
FIG. 22 is a schematic representation of the electrical circuit comprising a plurality of amplifier circuits connected in series.

This invention is directed to a sound actuated display device incorporating vibratory-rotary motion converter 10.

The display device comprises a base 20, a housing 12, a vibratory member 30, at least one hub assembly 40, a plurality of stems 52, a plurality of display elements 50, a means to support the vibratory member 32, an electrical circuit for converting sound into vibratory motion and providing a means to illuminate the plurality of display elements 50, shock absorption means 78, a screw 73, and a means to dampen vibration 75.

The base 20 has a bottom 24, side wall 22, and a top. The housing 12 has an inside and an outside, and the housing 12 can be removably connected to the base 20. The housing 12 can be constructed of a material adapted to allow structures within the housing to be viewed from outside the housing 12.

The vibratory member 30 has a first end 33 and a second end 34. The first end 33 of the vibratory member 30 is located within and extends through the inside of the housing 12. The second end 34 of the vibratory member 30 is located within the base 20.

A means to immobilize 14 the vibratory member 30 during transport can be provided. The means to immobilize 14 has a head 15 and a shank portion 16. The shank portion 16 has an aperture adapted to fit the first end 33 of the vibratory member 30. The housing 12 can have a hole adapted to receive the shank portion 16 of the means to immobilize 14. The hole is positioned such that when the shank portion 16 of the means to immobilize 14 extends through the hole the aperture in the shank portion 16 is positioned to receive the first end 33 of the vibratory member 30. The hole should be small enough to restrict the head 15 of the means to immobilize 14 from passing through it.

The hub assembly comprises a hub 40, a brake 42, and a ring 46. The hub 40 has a central aperture, the aperture being adapted to receive the vibratory member 30. The hub 40 is rotationally attached to the vibratory member 30 such that the vibratory member passes through the central aperture and the hub 40 rests upon the brake 42. In a preferred embodiment, the hub 40 is generally dome-shaped and is attached to the brake. The hub can be constructed of polymeric material, such as plastic and metallic material. Other materials could be used.

The brake 42 has a central aperture 44 adapted to receive the vibratory member 30. The brake 42 is rotationally attached to the vibratory member 30 such that the vibratory member passes through the central aperture 44. The brake 42 has at least one flexible arm 43 that rests upon the ring 46. In a preferred embodiment, the brake is attached to the hub. The brake can be constructed of flexible material such as sheet metal and polymeric materials.

The ring 46 has a central aperture adapted to receive the vibratory member 30. The ring 46 is tightly fitted around the vibratory member 30 such that the vibratory member passes through the central aperture. In a preferred embodiment, the ring should be made of hard material such as hard plastic, metal and other suitable material. The ring 46 supports the brake 42. In use, vibrations caused by a voice coil assembly 80 are transferred to the vibratory member 30. As the vibratory member vibrates the vibratory motion is transferred to the hub assembly. This causes the flexible arm 43 to flex as it rests upon the ring. As the arm 43 straightens from the flexion, the resultant force against the ring causes the brake 42 to rotate around the vibratory member 30. The hub 40 resting upon or attached to the brake 42 likewise rotates, and the vibratory motion is thereby converted to rotary motion.

Each of the plurality of stems 52 is fixedly attached to and radiating out from the hub 40. Each of the plurality of display elements 50 is fixedly attached to a corresponding stem from the plurality of stems 52 such that each stem is attached to at least one display element from the plurality of display elements 50 and each of the plurality of display elements is attached to a stem.

The display elements 50 can be constructed of lightweight material, for example polymeric and any other suitable material. In a preferred embodiment, the material can be ultraviolet responsive plastics with high phosphor content. The display elements can be of different and varying shapes, sizes, and colors, generally designed for aesthetic value, for example spherical and other geometric shapes, and astronomical, astrological, animal, plant, sports equipment, and any other aesthetically pleasing shape. In a preferred embodiment, however, the display elements should be disposed such that their weight is approximately balanced relative to the vibratory member. The possibilities are virtually limitless. In the accompanying drawings, the display elements are shown as spherical shapes by way of example.

The electrical circuit for converting sound into vibratory motion and providing a means to illuminate the plurality of display elements 50 is attached to the inside of the base 20. The electrical circuit comprises:

a) means for receiving electric power and supplying the electrical power to the circuit 70, b) means for receiving electrical impulses resulting from a conversion of audio signal input into electrical impulses 72, c) at least one amplifier circuit for amplifying the electrical impulses 85, the amplifier circuit electrically connected to the means for receiving electrical impulses, the amplifier circuit electrically connected to the means for receiving electric power and supplying the electric power to the circuit, d) a voice coil assembly 80 for converting the amplified electrical impulses to vibratory motion, the voice coil assembly electrically connected to the amplifier circuit, e) means to illuminate the plurality of display elements 90, the means to illuminate being electrically connected to and powered by the electrical power supplied by the means for supplying electrical power 70.

The voice coil assembly 80 has a top plate 81, a bottom plate 82, a magnet 83 between and attached to the top plate and the bottom plate, a voice coil form 84, conductive wire 86 coiled around the voice coil form, a spider 87, and a pole 88. Alternatively, the pole can be attached directly to the bottom plate or top plate to form one unitary structure rather than separate bottom plate and pole.

The magnet 83 has a central aperture. The conductive wire 86 is coiled around the voice coil form 84 such that the coil is located within the central aperture of the magnet 83 and surrounds the pole 88. The pole has a central aperture adapted to receive the vibratory member 30.

Figure 23:
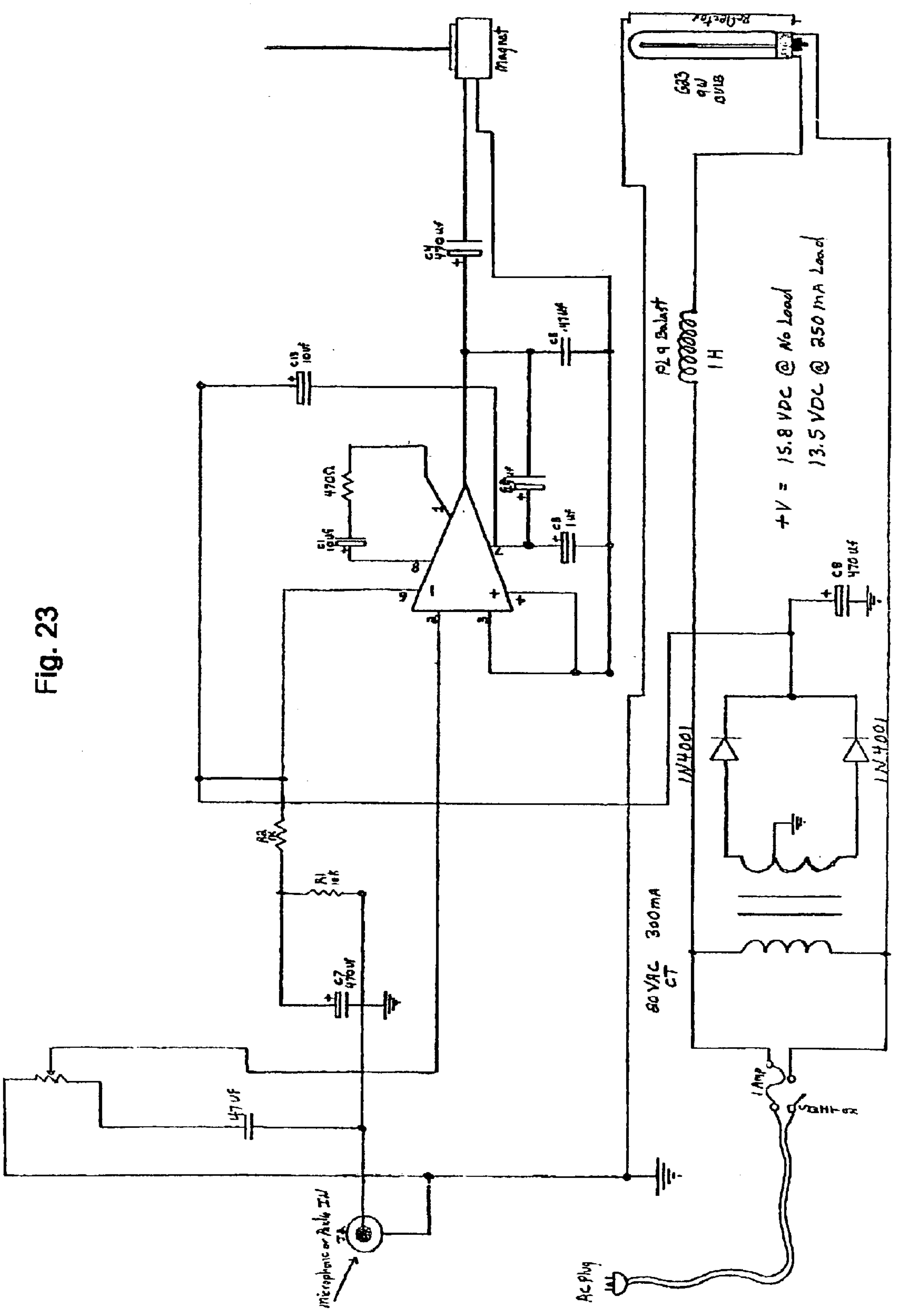
FIG. 23 is a circuit diagram showing a preferred embodiment of the electrical circuit.
Figure 24:
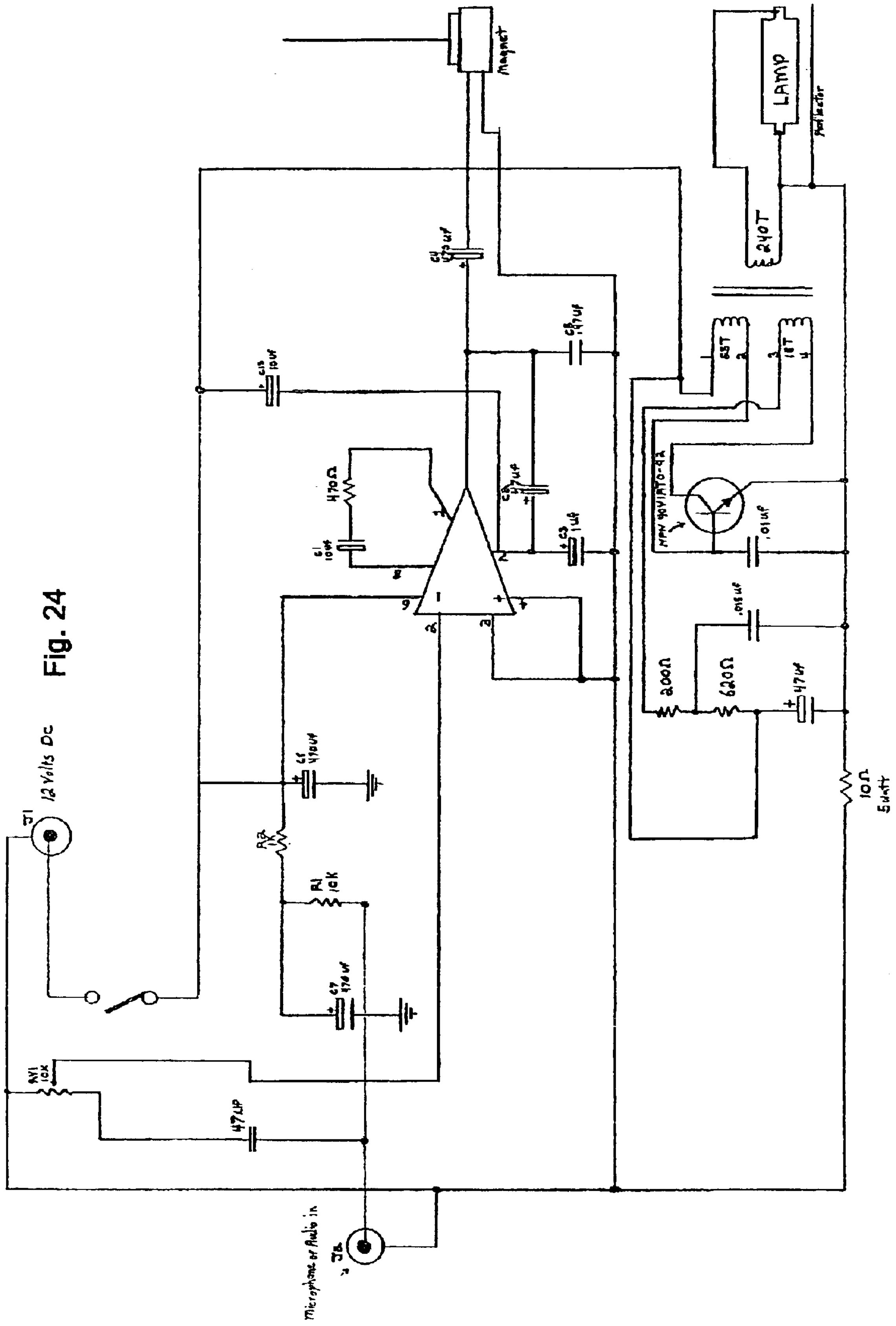
FIG. 24 is a circuit diagram showing an alternative embodiment of the electrical circuit.

The amplifier circuit 85 can be constructed so as to amplify noise from the circuit itself in order to increase the sensitivity of the circuit to electrical impulses resulting from a conversion of audio signal input into electrical impulses, thus increasing intensity of the vibrations created by the voice coil. FIG. 23 and FIG. 24 detail this construction. Multiple amplifier circuits, for example 85, 85', and 85'', can be connected in series to further amplify signals received from the means for receiving electrical impulses 72 resulting from a conversion of audio signal input into electrical impulses. A microphone can be provided to convert audio signals into electrical impulses and send the electrical impulses resulting from the conversion to the means for receiving electrical impulses 72 resulting from a conversion of audio signal input into electrical impulses.

A means to attenuate electrical impulses 97 received by the means to receive electrical impulses 72 can be provided. The means to attenuate 97 can be provided with the capability to operate the means 97 remotely from and locally to the device. Remote operation can be achieved using radio frequency, infrared, laser, and hard-wired remote devices. These devices are generally known in the art.

In a preferred embodiment, the means to illuminate 90 the display devices can comprise a black light. The black light can be located within the base 20 such that it casts its light toward the display elements 50. Other light sources are anticipated, such as incandescent and other types of light sources.

The means to support 32 the vibratory member 30 has a central aperture. The vibratory member passes through and snuggly fits into the central aperture of the means to support 32 the vibratory member 30 such that the vibratory member is fixedly attached to the means to support the vibratory member. The second end 34 of the vibratory member 30 is located on the opposite side of the means to support 32 the vibratory member from the first end 33 of the vibratory member, and is located within the central aperture of the magnet 83 as well as the central aperture of the pole 88. The means to support 32 the vibratory member 30 is fixedly attached to and positioned atop the voice coil form 84.

The shock absorption means 78 is located beneath the voice coil assembly 80 and above the bottom 24 of the base 20, such that the voice coil assembly 80 rests upon the shock absorption means 78, the shock absorption means resting upon the base 20. The screw 73 has a head 74 and a shank portion 76. The shank portion 76 has a flat end. The screw 73 passes through the base 20 such that the head 74 of the screw is located outside the bottom 24 of the base 20 and the shank portion 76 is secured to the pole 88 of the voice coil assembly 80 such that the flat end of the shank 76 portion stops beneath the second end 34 of the vibratory member 30. The flat end of the shank portion 76 limits the movement of the vibratory member 30. The means to dampen vibration 75 has a central aperture. The shank portion 76 of the screw 73 passes through the central aperture of the means to dampen vibration 75. The means to dampen vibration is positioned between the head 74 of the screw and the bottom 24 of the base 20, and reduces dissipation of vibratory motion to the base 20.

The means to illuminate the display elements 50 can also be located within the each of the plurality of display elements. Light Emitting Diodes 95 or other small light sources can be used.

In this case, the vibratory member 30 can have an inner conductive core 100 of positive polarity, an insulating shield 105 surrounding the inner conductive core 100, and an outer conductive sheath 110 of negative polarity. The outer conductive sheath 110 and the insulating sheath 105 each have at least one gap 115 to expose the inner conductive core 100. The inner conductive core and the outer conductive sheath are electrically connected to means to provide electric current 138 to the vibratory member 30. The means to provide electric current is electrically connected to the means to the means for receiving electric power 70.

The hub assembly can further comprise a glide assembly. Individual glides of the glide assembly can be constructed of conductive material such as metal and conductive polymers. The glide assembly comprises a first glide 117 of negative polarity, a second glide 118 of negative polarity, a third glide of positive polarity 119, a conductive bridge 120 connecting the first glide 117 and the second glide 118, a means to receive a first conductive member 55 electrically connected to the first glide 117 and the second glide 118, and a means to receive a second conductive member 58 electrically connected to the third glide 119.

The first glide 117 and the second glide 118 are positioned such that the first glide 117 is electrically and rotationally attached to the outer conductive sheath 110 below the gap 115 to expose the inner conductive core 100 and the second glide 118 is electrically and rotationally attached to the outer conductive sheath 110 above the gap 115 to expose the inner conductive core 100. The third glide 119 is electrically and rotationally attached to the inner conductive core 100 via the gap 115 to expose the inner conductive core, and the third glide is electrically insulated from the first and second glides. As the hub 40 rotates around the vibratory member 30 the first and second glides make electrical contact to the outer conductive sheath 110 while the third glide make electrical contact with the inner conductive core 100.

Alternatively, a first glide 56 of negative polarity and a second glide 57 of positive polarity can be used. The first glide 56 is rotationally and electrically connected to the outer conductive sheath 110. The second glide 57 is rotationally and electrically connected to the inner conductive core 100 via the gap 115 to expose the inner conductive core 100. In this case, the hub 40 can be constructed using conductive material, and the first glide 56 is electrically connected to the conductive hub 40. The second glide is electrically insulated from the first glide. In this way, the gap 115 to expose the inner conductive core 100 can be bridged without the use of another glide of negative polarity as well as without a conductive bridge.

A means to receive a first conductive member 55 is electrically connected to the first glide 56. A means to receive a second conductive member 58 is electrically connected to the second glide 57.

Each of the plurality of stems 52 has a first conductive member 130 of negative polarity and a second conductive member 132 of positive polarity. Each of the plurality of stems 52 are fixedly attached to and radiating out from the hub 40 such that the first conductive member 130 is electrically connected to a means to receive 55 the first conductive member 130 and the second conductive member 132 is electrically connected to a means to receive 58 a second conductive member 132.

Each of the plurality of display elements 50 has a light emitting diode 95 electrically connected to the first conductive member 130 and the second conductive member 132 of a corresponding stem.

The electrical circuit can be constructed to be capable of providing a means to provide electrical current to the vibratory member 30. The electrical circuit can comprise:

a) means for receiving electric power and supplying the electrical power to the circuit 70, b) means for receiving electrical impulses resulting from a conversion of audio signal input into electrical impulses 72, c) at least one amplifier circuit for amplifying the electrical impulses 85. The amplifier circuit electrically is connected to the means for receiving electrical impulses 72 and electrically connected to the means for receiving electric power and supplying the electric power to the circuit 70.

d) a voice coil assembly 80 for converting the amplified electrical impulses to vibratory motion. The voice coil assembly electrically connected to the amplifier circuit 85.

e) means for providing electrical current to the vibratory member 138.

The means for providing electrical current 138 to the vibratory member 30 is electrically connected to the means for supplying electrical power 70. The means for providing electrical current 138 to the vibratory member 30 is electrically connected to the vibratory member such that current with a positive polarity is conducted to the inner conductive core 100. Current with a negative polarity is conducted to the outer conductive sheath 110.

The device 10 as described herein can be adapted to hang upside down from the description as presented. In that case, the base 20 could attach to a ceiling. The device would still be constructed as fully described herein, but the base 20 can be adapted to hang from rather than sit upon a surface.

We claim:

1. A sound actuated display device incorporating a vibratory-rotary motion converter, the display device comprising:

a base, the base having a bottom, side wall, and a top;

a housing, the housing having an inside and an outside, the housing being removably connected to the base, the housing being constructed of a material adapted to allow structures within the housing to be viewed from outside the housing;

a vibratory member, the vibratory member having a first end and a second end, the first end of the vibratory member being located within and extending through the inside of the housing, the second end of the vibratory member being located within the base;

at least one hub assembly, the hub assembly comprising a hub, a brake, and a hard ring, the hub having a central aperture, the aperture being adapted to receive the vibratory member, the hub being rotationally attached to the vibratory member such that the vibratory member passes through the central aperture, the hub resting upon the brake, the brake having a central aperture being adapted to receive the vibratory member, the brake being rotationally attached to the vibratory member such that the vibratory member passes through the central aperture, the brake having at least on flexible arm, the flexible arm resting upon the hard ring, the hard ring having a central aperture, the aperture being adapted to receive the vibratory member, the hard ring being tightly fitted around the vibratory member such that the vibratory member passes through the central aperture and the hard ring supports the brake;

a plurality of stems, each of the plurality of stems being fixedly attached to and radiating out from the hub;

a plurality of display elements, each of the plurality of display elements being fixedly attached to a corresponding stem from the plurality of stems such that each stem is attached to at least one display element from the plurality of display elements and each of the plurality of display elements is attached to a stem;

a means to support the vibratory member, the means to support the vibratory member having a central aperture, the vibratory member passing through and snuggly fitted into the central aperture of the means to support the vibratory member such that the vibratory member is fixedly attached to the means to support the vibratory member and the second end of the vibratory member is located on the opposite side of the means to support the vibratory member from the first end of the vibratory member;

an electrical circuit for converting sound into vibratory motion and providing a means to illuminate the plurality of display elements, the electrical circuit attached to the inside of the base, the electrical circuit comprising:

a) means for receiving electric power and supplying the electrical power to the circuit, b) means for receiving electrical impulses resulting from a conversion of audio signal input into electrical impulses, c) at least one amplifier circuit for amplifying the electrical impulses, the amplifier circuit electrically connected to the means for receiving electrical impulses, the amplifier circuit electrically connected to the means for receiving electric power and supplying the electric power to the circuit, d) a voice coil assembly for converting the amplified electrical impulses to vibratory motion, the voice coil assembly electrically connected to the amplifier circuit, e) means to illuminate the plurality of display elements, the means to illuminate being electrically connected to and powered by the electrical power supplied by the means for supplying electrical power;

the voice coil assembly having a top plate, a bottom plate, a magnet between the top plate and the bottom plate, the magnet having a central aperture, a voice coil form within the central aperture of the magnet, conductive wire coiled around the voice coil form such that the coiled wire is located within the central aperture of the magnet, a spider, a pole, the pole having a central aperture adapted to receive the vibratory member;

the means to support the vibratory member being fixedly attached to and positioned atop the voice coil form such that the second end of the vibratory member is located within the central aperture of the pole;

shock absorption means, the shock absorption means being located beneath the voice coil assembly and the bottom of the base;

a screw, the screw having a head and a shank portion, the shank portion having a flat end, the screw passing through the base such that the head of the screw is located outside the bottom of the base and the shank portion is secured to the pole of the voice coil assembly such that the flat end of the shank portion stops beneath the second end of the vibratory member to limit movement of the vibratory member;

a means to dampen vibration, the means to dampen vibration having a central aperture, the shank portion of the screw passing through the central aperture of the means to dampen vibration, the means to dampen vibration being positioned between the head of the screw and the bottom of the base.

2. A sound actuated display device incorporating a vibratory-rotary motion converter, the display device comprising:

a base, the base having a bottom, side wall, and a top;

a housing, the housing having an inside and an outside, the housing being removably connected to the base, the housing being constructed of a material adapted to allow structures within the housing to be viewed from outside the housing;

a vibratory member, the vibratory member having a first end and a second end, the first end of the vibratory member being located within and extending through the inside of the housing, the second end of the vibratory member being located within the base, the vibratory member having an inner conductive core of positive polarity, an insulating shield surrounding the inner conductive core, and an outer conductive sheath of negative polarity, the outer conductive sheath and the insulating sheath having at least one gap to expose the inner conductive core;

at least one hub assembly, the hub assembly comprising a hub, a brake, a hard ring, a first glide of negative polarity, a second glide of negative polarity, a third glide of positive polarity, a conductive bridge connecting the first glide and the second glide, a means to receive a first conductive member electrically connected to the first glide and the second glide, and a means to receive a second conductive member electrically connected to the third glide, the hub having a central aperture, the aperture being adapted to receive the vibratory member, the hub being rotationally attached to the vibratory member such that the vibratory member passes through the central aperture, the hub resting upon the brake;

the first glide and the second glide being positioned such that the first glide is electrically and rotationally attached to the outer conductive sheath below the gap to expose the inner conductive core and the second glide is electrically and rotationally attached to the outer conductive sheath above the gap to expose the inner conductive core, the third glide being electrically and rotationally attached to the inner conductive core via the gap to expose the inner conductive core;

the brake having a central aperture being adapted to receive the vibratory member, the brake being rotationally attached to the vibratory member such that the vibratory member passes through the central aperture, the brake having at least on flexible arm, the flexible arm resting upon the hard ring, the hard ring having a central aperture, the central aperture of the hard ring being adapted to receive the vibratory member, the hard ring being tightly fitted around the vibratory member such that the vibratory member passes through the central aperture and the hard ring supports the brake;

a plurality of stems, each of the plurality of stems having a first conductive member of negative polarity and a second conductive member of positive polarity, each of the plurality of stems being fixedly attached to and radiating out from the hub such that the first conductive member is electrically connected to the means to receive a first conductive member and the second conductive member is electrically connected to the means to receive a second conductive member;

a plurality of display elements, each of the plurality of display elements having a light emitting diode electrically connected to the first conductive member and the second conductive member of a corresponding stem, each of the plurality of display elements being fixedly attached to a corresponding stem from the plurality of stems such that each stem is attached to at least one display element from the plurality of display elements and each of the plurality of display elements is attached to a stem;

a means to support the vibratory member, the means to support the vibratory member having a central aperture, the vibratory member passing through and snuggly fitted into the central aperture of the means to support the vibratory member such that the vibratory member is fixedly attached to the means to support the vibratory member and the second end of the vibratory member is located on the opposite side of the means to support the vibratory member from the first end of the vibratory member;

an electrical circuit for converting sound into vibratory motion and providing a means to provide electrical current to the vibratory member, the electrical circuit attached to the inside of the base, the electrical circuit comprising:

a) means for receiving electric power and supplying the electrical power to the circuit, b) means for receiving electrical impulses resulting from a conversion of audio signal input into electrical impulses, c) at least one amplifier circuit for amplifying the electrical impulses, the amplifier circuit electrically connected to the means for receiving electrical impulses, the amplifier circuit electrically connected to the means for receiving electric power and supplying the electric power to the circuit, d) a voice coil assembly for converting the amplified electrical impulses to vibratory motion, the voice coil assembly electrically connected to the amplifier circuit, e) means for providing electrical current to the vibratory member, the means for providing electrical current to the vibratory member being electrically connected to the means for supplying electrical power, the means for providing electrical current to the vibratory member being electrically connected to the vibratory member such that current with a positive polarity is conducted to the inner conductive core and current with a negative polarity is conducted to the outer conductive sheath;

the voice coil assembly having a top plate, a bottom plate, a magnet between the top plate and the bottom plate, the magnet having a central aperture, a voice coil form within the central aperture of the magnet, conductive wire coiled around the voice coil form such that the coiled wire is located within the central aperture of the magnet, a spider, a pole, the pole having a central aperture adapted to receive the vibratory member;

the means to support the vibratory member being fixedly attached to and positioned atop the voice coil form such that the second end of the vibratory member is located within the central aperture of the pole;

shock absorption means, the shock absorption means being located beneath the voice coil assembly and the bottom of the base;

a screw, the screw having a head and a shank portion, the shank portion having a flat end, the screw passing through the base such that the head of the screw is located outside the bottom of the base and the shank portion is secured to the pole of the voice coil assembly such that the flat end of the shank portion stops beneath the second end of the vibratory member;

a means to dampen vibration, the means to dampen vibration having a central aperture, the shank portion of the screw passing through the central aperture of the means to dampen vibration, the means to dampen vibration being positioned between the head of the screw and the bottom of the base.

3. A sound actuated display device incorporating a vibratory-rotary motion converter, the display device comprising:

a base, the base having a bottom, side wall, and a top;

a housing, the housing having an inside and an outside, the housing being removably connected to the base, the housing being constructed of a material adapted to allow structures within the housing to be viewed from outside the housing;

a vibratory member, the vibratory member having a first end and a second end, the first end of the vibratory member being located within and extending through the inside of the housing, the second end of the vibratory member being located within the base, the vibratory member having an inner conductive core of positive polarity, an insulating shield surrounding the inner conductive core, and an outer conductive sheath of negative polarity, the outer conductive sheath and the insulating sheath having at least one gap to expose the inner conductive core;

at least one hub assembly, the hub assembly comprising a hub constructed of conductive material, a brake, a hard ring, a first glide of negative polarity electrically connected to the hub, a second glide of positive polarity, a means to receive a first conductive member electrically connected to the first glide, and a means to receive a second conductive member electrically connected to the second glide, the hub having a central aperture, the aperture being adapted to receive the vibratory member, the hub being rotationally attached to the vibratory member such that the vibratory member passes through the central aperture, the hub resting upon the brake;

the first glide being positioned such that the first glide is electrically and rotationally attached to the outer conductive sheath, the second glide being electrically and rotationally attached to the inner conductive core via the gap to expose the inner conductive core;

the brake having a central aperture being adapted to receive the vibratory member, the brake being rotationally attached to the vibratory member such that the vibratory member passes through the central aperture, the brake having at least on flexible arm, the flexible arm resting upon the hard ring, the hard ring having a central aperture, the central aperture of the hard ring being adapted to receive the vibratory member, the hard ring being tightly fitted around the vibratory member such that the vibratory member passes through the central aperture and the hard ring supports the brake;

a plurality of stems, each of the plurality of stems having a first conductive member of negative polarity and a second conductive member of positive polarity, each of the plurality of stems being fixedly attached to and radiating out from the hub such that the first conductive member is electrically connected to the means to receive a first conductive member and the second conductive member is electrically connected to the means to receive a second conductive member;

a plurality of display elements, each of the plurality of display elements having a light emitting diode electrically connected to the first conductive member and the second conductive member of a corresponding stem, each of the plurality of display elements being fixedly attached to a corresponding stem from the plurality of stems such that each stem is attached to at least one display element from the plurality of display elements and each of the plurality of display elements is attached to a stem;

a means to support the vibratory member, the means to support the vibratory member having a central aperture, the vibratory member passing through and snuggly fitted into the central aperture of the means to support the vibratory member such that the vibratory member is fixedly attached to the means to support the vibratory member and the second end of the vibratory member is located on the opposite side of the means to support the vibratory member from the first end of the vibratory member;

an electrical circuit for converting sound into vibratory motion and providing a means to provide electrical current to the vibratory member, the electrical circuit attached to the inside of the base, the electrical circuit comprising:

a) means for receiving electric power and supplying the electrical power to the circuit, b) means for receiving electrical impulses resulting from a conversion of audio signal input into electrical impulses, c) at least one amplifier circuit for amplifying the electrical impulses, the amplifier circuit electrically connected to the means for receiving electrical impulses, the amplifier circuit electrically connected to the means for receiving electric power and supplying the electric power to the circuit, d) a voice coil assembly for converting the amplified electrical impulses to vibratory motion, the voice coil assembly electrically connected to the amplifier circuit, e) means for providing electrical current to the vibratory member, the means for providing electrical current to the vibratory member being electrically connected to the means for supplying electrical power, the means for providing electrical current to the vibratory member being electrically connected to the vibratory member such that current with a positive polarity is conducted to the inner conductive core and current with a negative polarity is conducted to the outer conductive sheath;

the voice coil assembly having a top plate, a bottom plate, a magnet between the top plate and the bottom plate, the magnet having a central aperture, a voice coil form within the central aperture of the magnet, conductive wire coiled around the voice coil form such that the coiled wire is located within the central aperture of the magnet, a spider, a pole, the pole having a central aperture adapted to receive the vibratory member;

the means to support the vibratory member being fixedly attached to and positioned atop the voice coil form such that the second end of the vibratory member is located within the central aperture of the pole;

shock absorption means, the shock absorption means being located beneath the voice coil assembly and the bottom of the base;

a screw, the screw having a head and a shank portion, the shank portion having a flat end, the screw passing through the base such that the head of the screw is located outside the bottom of the base and the shank portion is secured to the pole of the voice coil assembly such that the flat end of the shank portion stops beneath the second end of the vibratory member;

a means to dampen vibration, the means to dampen vibration having a central aperture, the shank portion of the screw passing through the central aperture of the means to dampen vibration, the means to dampen vibration being positioned between the head of the screw and the bottom of the base.

4. A device as in claim 1 wherein the means to illuminate the display elements comprises a black light.

5. A devices as in claim 1, 2 or 3 further comprising a means to immobilize the vibratory member, the means to immobilize having a head and a shank portion, the shank portion having an aperture adapted to fit the first end of the vibratory member;

the housing having a hole adapted to receive the shank portion of the means to immobilize, the hole being positioned such that when the shank portion of the means to immobilize extends through the hole the aperture in the shank portion is positioned to receive the first end of the vibratory member, and the hole being small enough to restrict the head of the means to immobilize from passing through.

6. A device as in claim 1, 2, or 3 further comprising a microphone, the microphone being electrically connected to the means for receiving electrical impulses resulting from a conversion of audio signal input into electrical impulses.

7. A device as in claim 1, 2, or 3 wherein the electrical circuit further comprises a means to attenuate electrical impulses resulting from a conversion of audio signal input into electrical impulses received by the means to receive electrical impulses resulting from a conversion of audio signal input into electrical impulses.

8. A device as in claim 7 wherein the means to attenuate electrical impulses resulting from a conversion of audio signal input into electrical impulses is capable of remote operation.

9. A device as in claim 1, 2, or 3 wherein the amplifier circuit is adapted to amplify noise from the electrical circuit as well as electrical impulses received by the means to receive electrical impulses.

* * * * *